United States Patent
Cao

(10) Patent No.: US 11,381,945 B2
(45) Date of Patent: *Jul. 5, 2022

(54) USE OF IDENTITY DATA ASSOCIATED WITH A DEVICE FOR DIRECTING COMMUNICATIONS TO ANOTHER DEVICE

(71) Applicant: Citrix Systems, Inc., Fort Lauderdale, FL (US)

(72) Inventor: Lei Cao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/071,075

(22) Filed: Oct. 15, 2020

(65) Prior Publication Data

US 2021/0029522 A1    Jan. 28, 2021

Related U.S. Application Data

(63) Continuation of application No. 16/053,125, filed on Aug. 2, 2018, now Pat. No. 10,848,943, which is a continuation of application No. PCT/CN2018/093521, filed on Jun. 29, 2018.

(51) Int. Cl.
*H04W 4/60* (2018.01)
*H04W 76/10* (2018.01)
*H04W 4/20* (2018.01)

(52) U.S. Cl.
CPC ............... *H04W 4/60* (2018.02); *H04W 4/20* (2013.01); *H04W 76/10* (2018.02)

(58) Field of Classification Search
CPC ........................... H04L 63/08; H04L 61/605
USPC .......................................... 370/352, 465, 329
See application file for complete search history.

(56) References Cited

U.S. PATENT DOCUMENTS

| 2006/0205395 A1* | 9/2006 | Barone ................... H04L 67/34 455/420 |
| 2007/0112964 A1* | 5/2007 | Guedalia ............. H04L 65/1006 709/227 |
| 2010/0279678 A1 | 11/2010 | Li et al. |
| 2010/0332635 A1 | 12/2010 | Rogel et al. |

(Continued)

OTHER PUBLICATIONS

"Understanding SIM evolution" GSMA Intelligence, gsmaintelligence. com, Mar. 2015, pp. 1-17.

(Continued)

*Primary Examiner* — Kiet M Doan
(74) *Attorney, Agent, or Firm* — Banner & Witcoff, Ltd.

(57) ABSTRACT

Methods and systems for using and/or storing identity data associated with a device to direct communications to another device are described herein. A server may store identity data, such as subscriber identity module (SIM) data, associated with a device or user. The SIM data may be used to authenticate and/or register the device or user with a mobile network. Using the SIM data, other devices may use the capabilities of the first device. The server may receive, from another device, a request to access one or more capabilities of the first device. Based on the request, the server may send a request to register the SIM data with a mobile network. After registration of the SIM data with the mobile network, the server may be used to direct communications to the other device.

20 Claims, 12 Drawing Sheets

(56) References Cited

U.S. PATENT DOCUMENTS

| | | |
|---|---|---|
| 2011/0237238 A1* | 9/2011 | Hassan ............. H04M 15/8022 |
| | | 455/422.1 |
| 2012/0149372 A1* | 6/2012 | Lee ....................... G01S 5/0263 |
| | | 455/435.1 |
| 2012/0178500 A1 | 7/2012 | Hwang |
| 2016/0036476 A1 | 2/2016 | Cho et al. |
| 2016/0165057 A1 | 6/2016 | Guedalia et al. |
| 2016/0205546 A1 | 7/2016 | Poon et al. |
| 2017/0127214 A1 | 5/2017 | Sohn et al. |
| 2017/0201850 A1 | 7/2017 | Raleigh et al. |

OTHER PUBLICATIONS

"Apple SIM—More choices for staying connected" Apple SIM—Apple, https://www.apple.com/ipad/apple-sim/, Jun. 8, 2018, pp. 1-8.

Neil Aitken "Embedded eSIMs vs. Soft SIMs—What's the difference?" Whatphone 2018, https://whatphone.com.au/sim-only-byo-plans/the-esim-and-what-it-means-to-you/embedded-esims-vs-soft-sims, Jun. 8, 2018, pp. 1-14.

"Manage your iCloud storage" Apple Support, https://support.apple.com/en-us/HT204247, May 29, 2018, pp. 1-7.

"Use Apple SIM with Wi-Fi + Cellular models of iPad" Apple Support, https://support.apple.com/en-us/ht203099, Mar. 28, 2018, pp. 1-3.

* cited by examiner

USE OF IDENTITY DATA ASSOCIATED WITH A DEVICE FOR DIRECTING COMMUNICATIONS TO ANOTHER DEVICE

CROSS-REFERENCE TO RELATED APPLICATIONS

This application is a Continuation of U.S. patent application Ser. No. 16/053,125, filed Aug. 2, 2018, entitled "Use of Identify Data Associated With a Device For Directing Communications to Another Device," which claims priority to PCT International Application No. PCT/CN2018/093521, filed Jun. 29, 2018 and entitled "Use of Identity Data Associated with a Device for Directing Communications to Another Device." The prior applications are incorporated herein by reference in their entirety for all purposes.

FIELD

Aspects described herein generally relate to computer networking and virtualization. More specifically, aspects described herein relate to use and/or storage of identity data associated with a device to direct communications to another device.

BACKGROUND

A user of a mobile device, such as a mobile phone, might not have access to the mobile device in some circumstances. For example, the user may lose the mobile phone, leave the phone at home while out of the home, etc. However, the user may desire to continue to use the mobile phone, such as to make and receive phone calls, send or receive messages, use applications of the mobile phone, etc. Additionally, the user may desire to use the mobile phone's applications with the same or similar privacy settings or user preferences.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, apparatuses, computer-readable media, memory, and methods for using and/or storing identity data associated with a device to direct communications to another device. A method may comprise storing, by a server, subscriber identity module (SIM) data and data associated with a first user device. The SIM data may comprise, for example, a phone number. A second user device may be connected, via a virtual channel, to a virtual machine running on the server. The server may receive, from the second user device, a request to access one or more capabilities of the first user device. After receiving the request to access one or more capabilities of the first user device, the server may send a request to register the SIM data with a mobile communication network. After registration of the SIM data with the mobile communication network, the server may receive a communication request directed to the phone number. The server may send, to the second user device and via the virtual channel, an image indicating the communication request directed to the phone number.

In some examples, the first user device may comprise a mobile device. SIM data may be stored on a SIM card of the mobile device. The method may comprise receiving, by the server and from the first user device, the SIM data and the data associated with the first user device. Storing the SIM data and the data associated with the first user device may comprise storing the received SIM data and the received data associated with the first user device.

In some examples, data associated with the first user device may comprise one or more of data indicating a plurality of applications installed on the first user device, data indicating a layout of icons associated with the plurality of applications installed on the first user device, or user application data associated with the plurality of applications installed on the first user device. Additionally or alternatively, data associated with the first user device may comprise data indicating an operating system of the first user device. Connecting the second user device to the virtual machine may be based on the operating system of the first user device.

In some examples, one or more capabilities of the first user device may comprise one or more of calling capabilities or texting capabilities of the first user device. The communication request may comprise a ringing signal, such as for an incoming call.

In some examples, the server may receive, from the second user device and via the virtual channel, an acceptance of the communication request directed to the phone number. After receiving the acceptance of the communication request, a communication channel between the second user device and a base station of the mobile communication network may be established via the virtual channel. Alternatively, after receiving the acceptance of the communication request, a client agent of the second user device may establish a communication channel between the second user device and the base station of the mobile communication network.

In some examples, sending the request to register the SIM data may comprise sending, by the server and to a second server, the request to register the SIM data. Receiving the communication request directed to the phone number may comprise receiving, by the server and from the second server, the communication request directed to the phone number.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods and systems for using and/or storing identity data associated with a device to direct communications to another device. A server may store subscriber identity module (SIM) data and data associated with a first user device. The SIM data may comprise, for example, a phone number. A second user device may be connected, via a virtual channel, to a virtual machine running on the server, and the server may receive, from the second user device, a request to access one or more capabilities of the first user device. The server may send a request to register the SIM data with a mobile communication network. After registration of the SIM data with the mobile communication network, the server may receive a communication request directed to the phone number. The server may send, to the second user device and via the virtual channel, an image indicating the communication request directed to the phone number.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
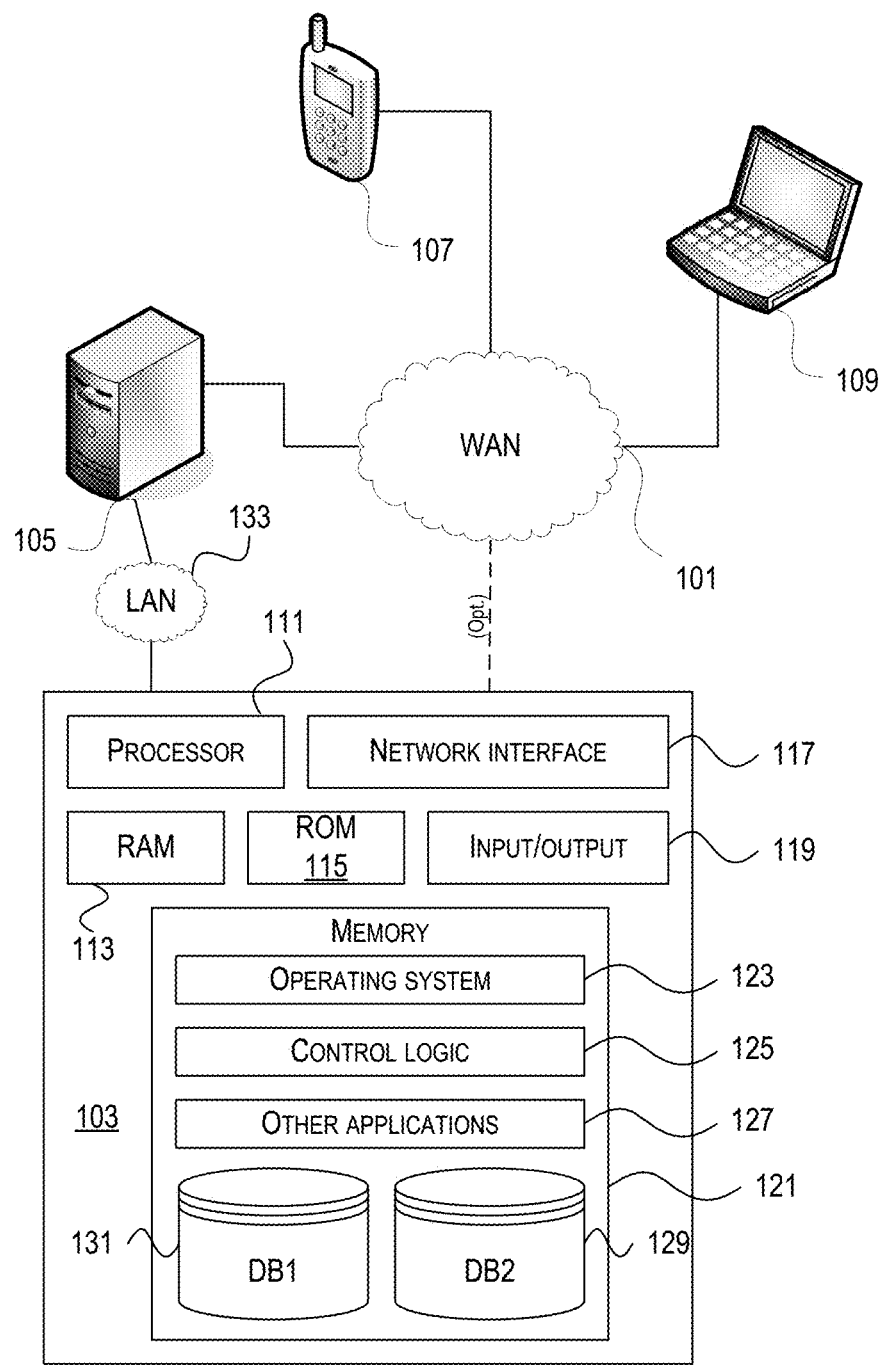
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
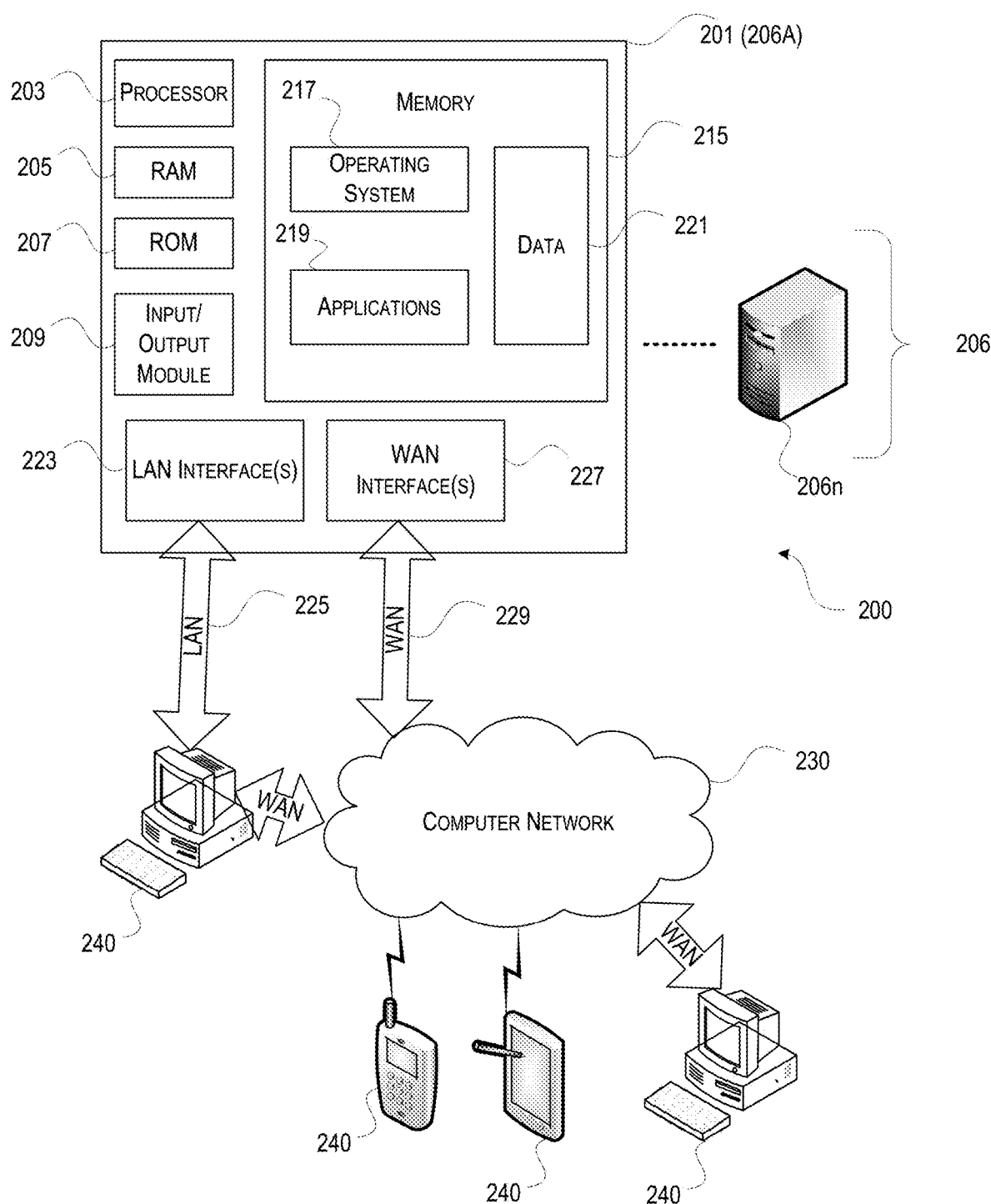
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
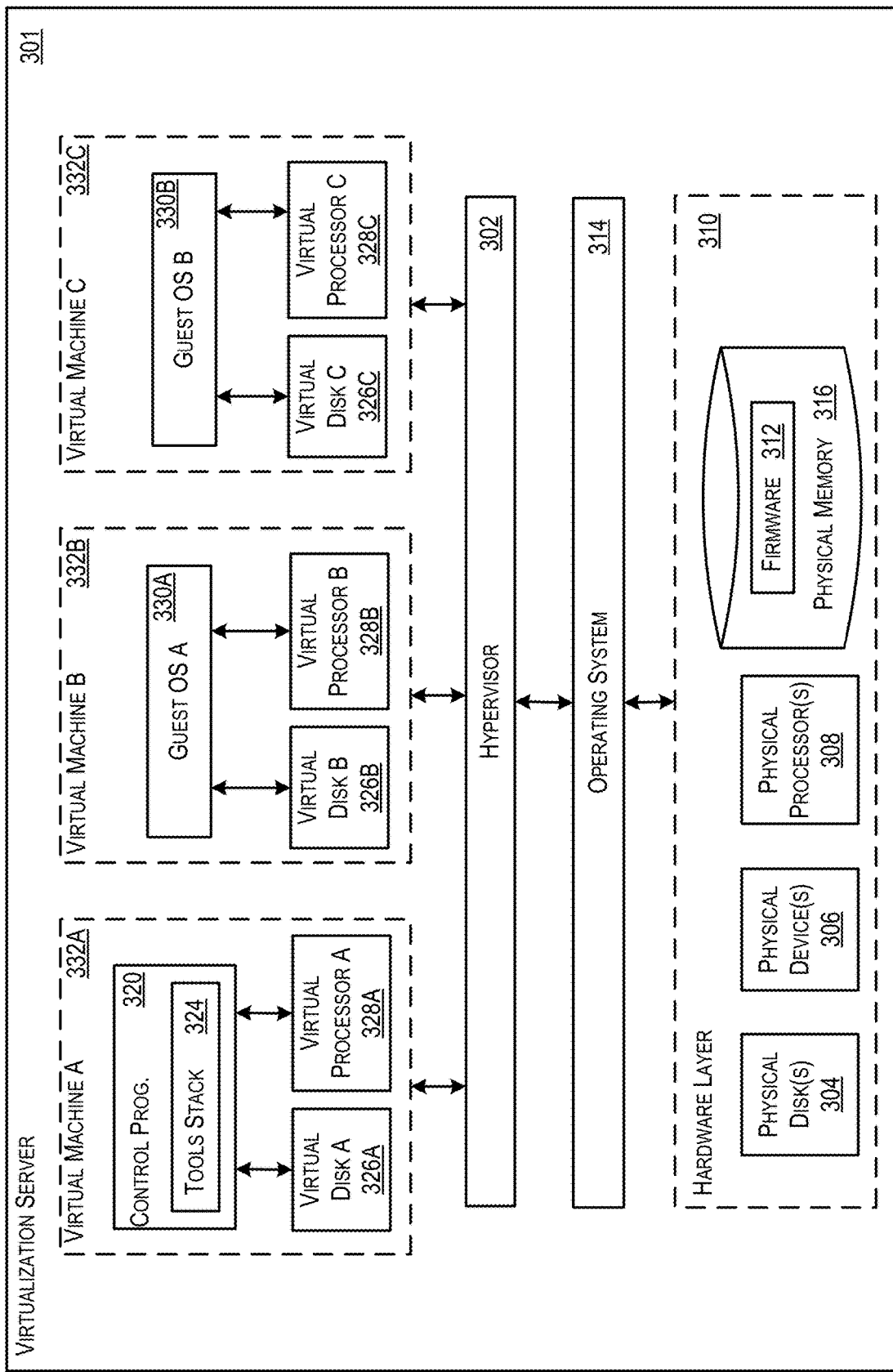
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
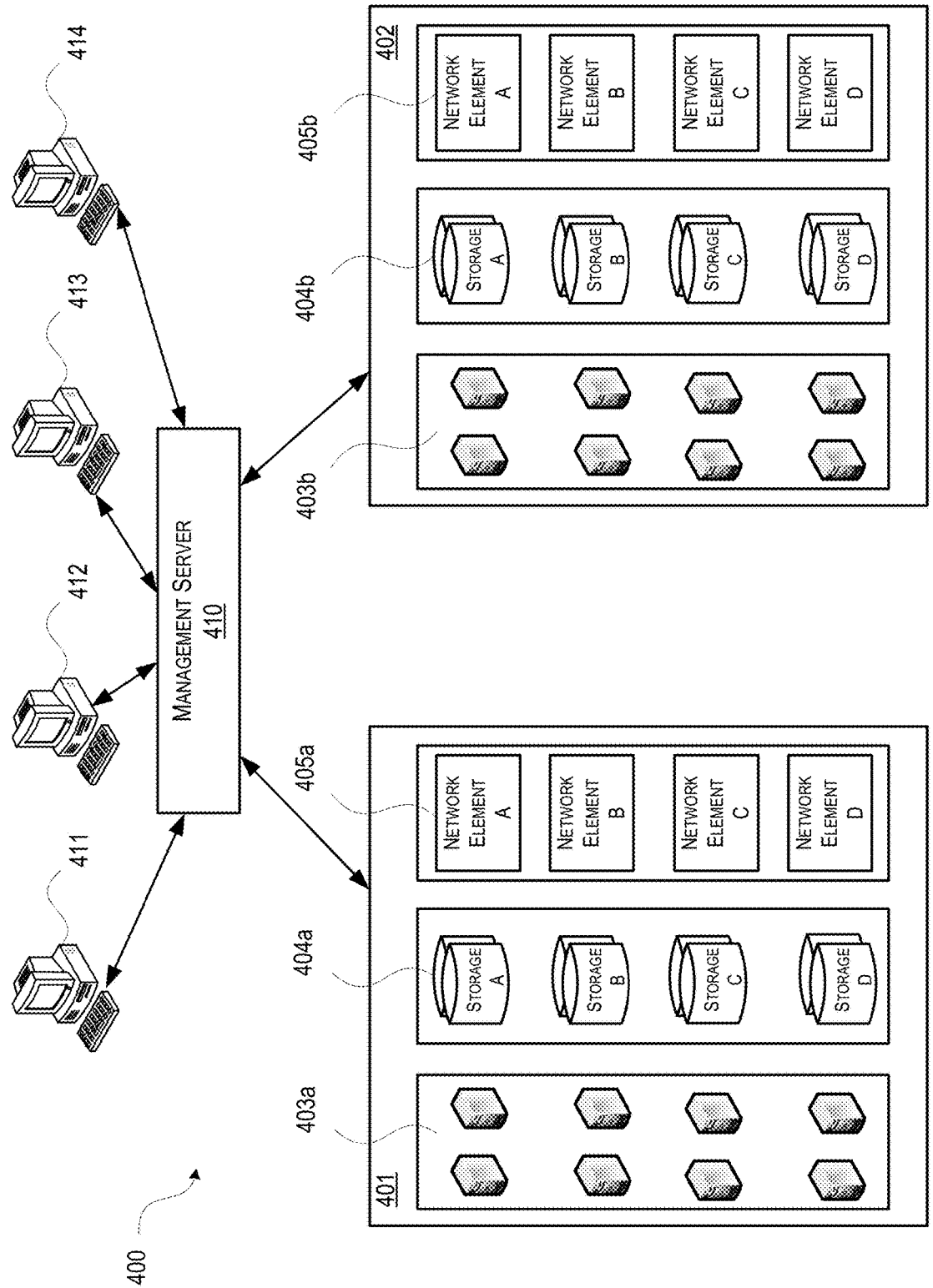
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
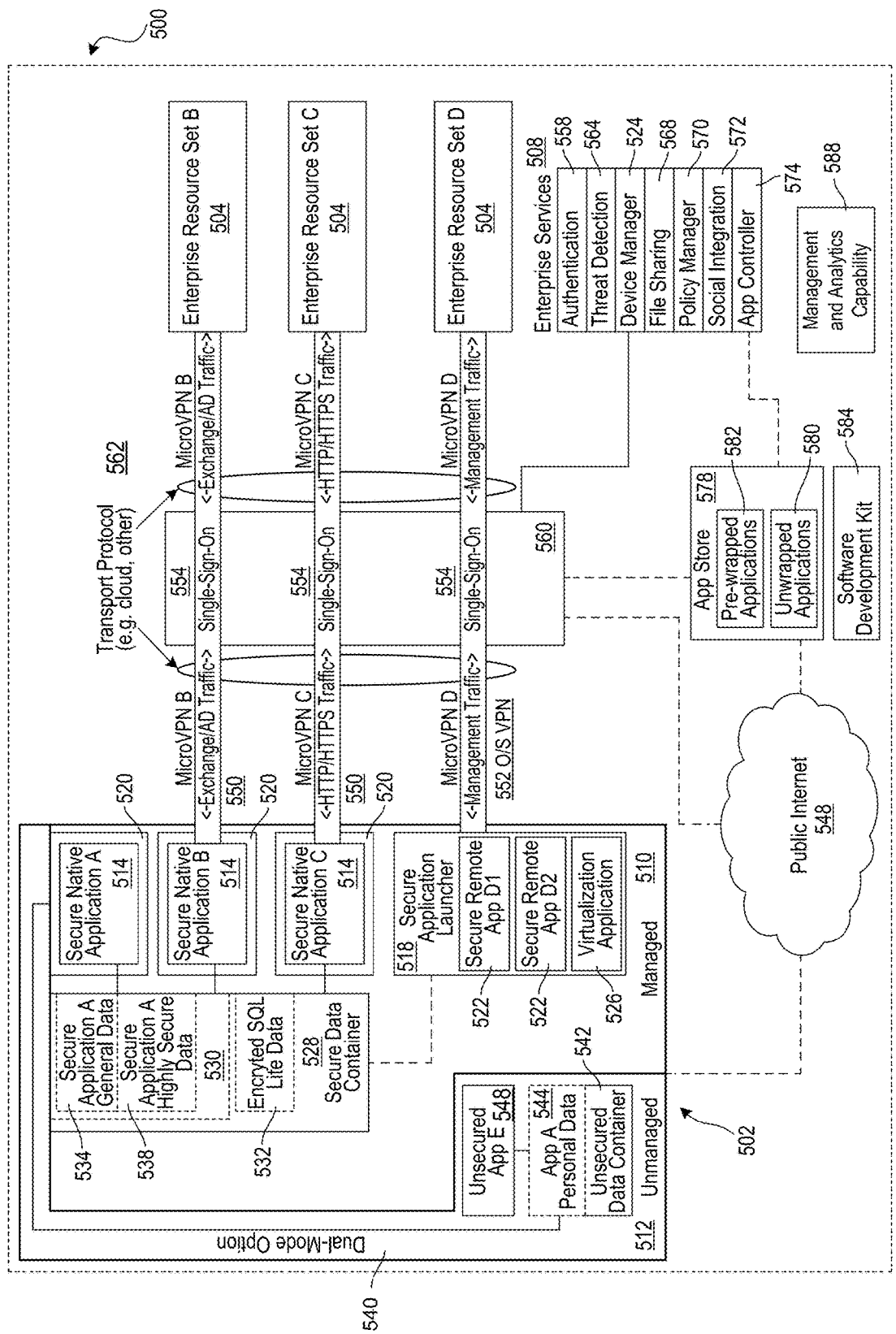
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
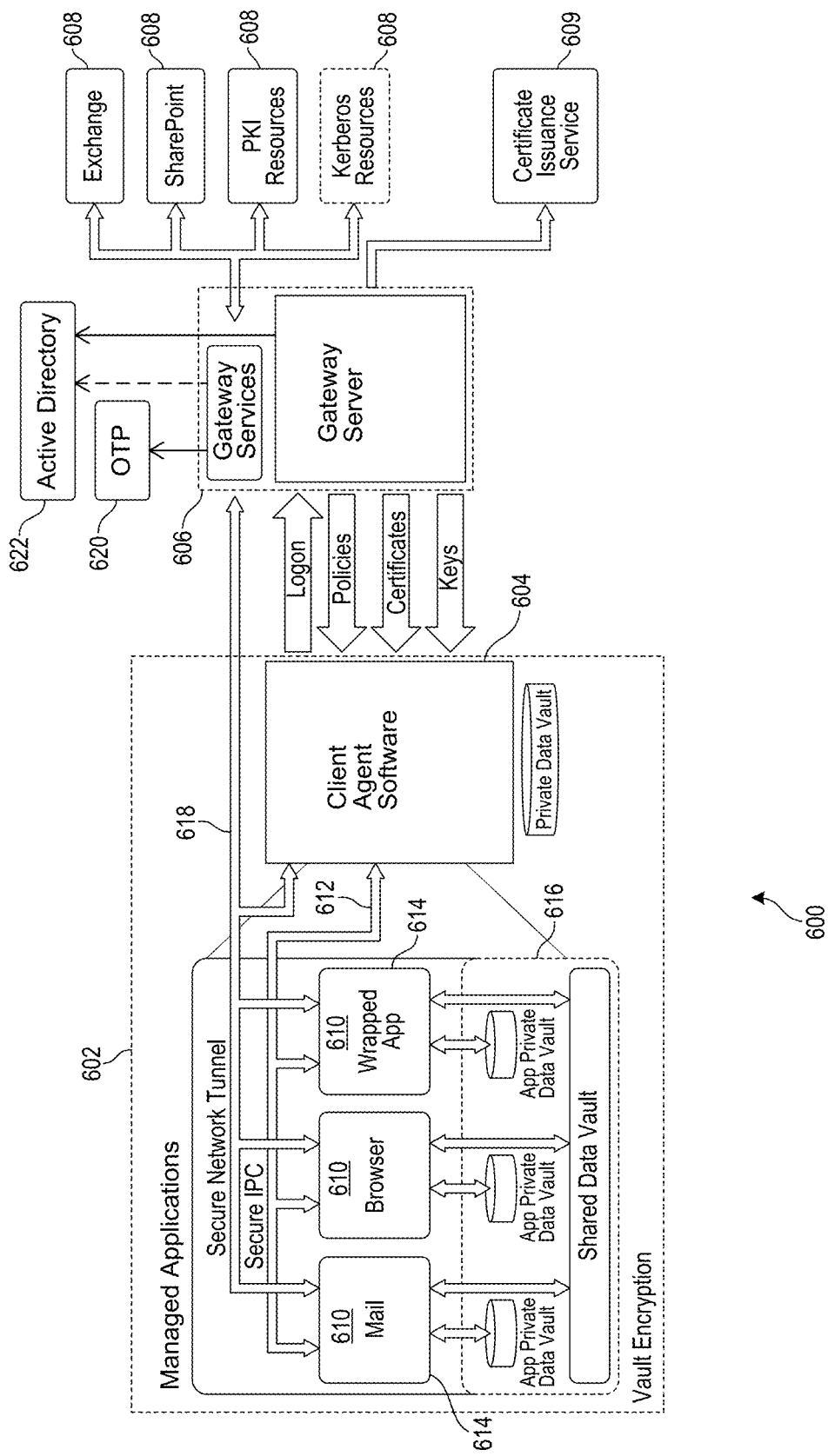
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Using Identity Data for Directing Communications to Another Device

Figure 7:
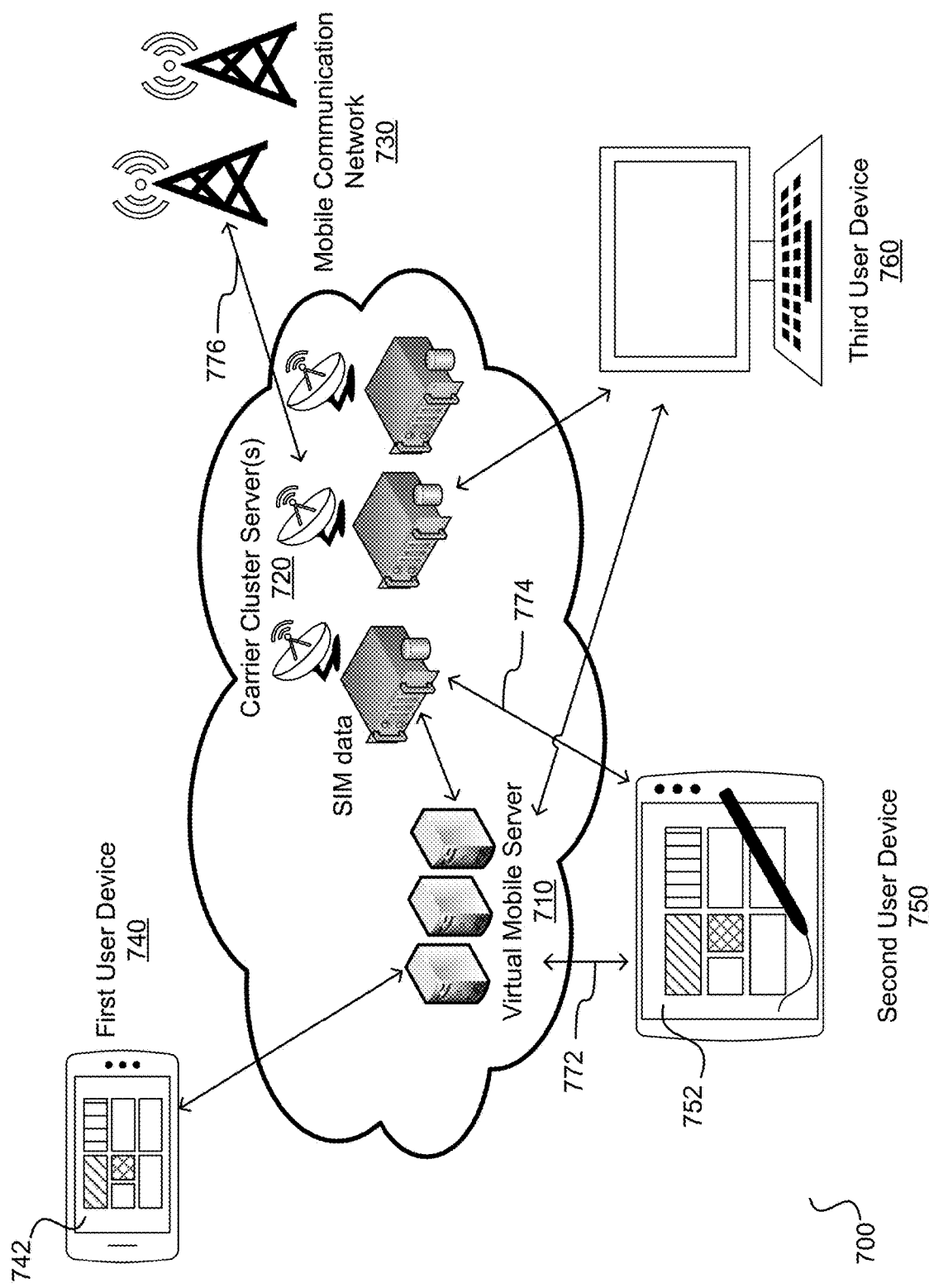
FIG. 7 illustrates an example system for using identity data associated with a device for directing communications to another device in accordance with one or more illustrative aspects described herein.

FIG. 7 illustrates an example system 700 for using identity data associated with a device for directing communications to another device in accordance with one or more illustrative aspects described herein. SIM data associated with one device may be used to direct incoming communications to another device. For example, a server may store the SIM data associated with the first device. If a user desires to receive the first device's communication on the second device, the SIM data may be registered with a mobile communication network, and communications directed to the SIM may be rerouted to the second device instead of the first device.

The system 700 may comprise one or more virtual mobile servers 710. The virtual mobile server(s) 710 may, for example, provide (e.g., host) virtual desktops, virtual applications, and/or other virtual resources for one or more different devices, such as a first user device 740 (e.g., a mobile phone), a second user device 750 (e.g., a tablet computer), a third user device 760 (e.g., a personal computer), or other user devices. For example, the virtual mobile server(s) 710 may host virtual machines for the different devices, and the virtual machines may be based on the operating system of the devices (e.g., iOS, ANDROID, etc.). The virtual mobile server(s) 710 may detect the operating system of the device, or the user of the device may select the operating system for the device. The operating system of the device may be stored at the virtual mobile server 710 and/or in a user profile accessible to the virtual mobile server 710. As will be described in further detail below, the virtual mobile server 710 may store SIM data associated with a user device (e.g., the first user device 740) to enable other user devices (e.g., the second user device 750 or the third user device 760) to receive communications directed to the first device.

The system 700 may comprise one or more carrier cluster server(s) 720. The carrier cluster server(s) 720 may provide carrier communication services to facilitate phone calls, text messages, or other communications between devices. For example, the carrier cluster server(s) 720 may communicate with the mobile communication network 730 via a communication link 776 to register SIM data with the network. SIM data may also be stored at the carrier cluster server(s) 720. The carrier cluster server(s) 720 may be the same server(s) as the virtual mobile server(s) 710 or may be different server(s). The virtual mobile server(s) 710 and/or the carrier cluster server(s) 720 may provide the communication rerouting service as a cloud service. For example, capabilities of a real mobile phone may be provided as a service in the cloud, and the cloud service may be made available to other devices.

The system 700 may comprise the mobile communication network 730. The mobile communication network 730 may comprise a Global System for Mobiles (GSM) network, a Code Division Multiple Access (CDMA) network, a 4th-Generation Long-Term Evolution (LTE) network, a 5th-Generation New Radio (NR) network, and/or another type of mobile communication network. The mobile communication network 730 may comprise a plurality of base stations and other network devices to facilitate communications (e.g., phone calls, text messages, such as short message service (SMS) messages or multimedia messaging service (MMS) messages, video conferences, etc.) between different users or subscribers of the mobile communication network 730 and/or users or subscribers of other mobile communication networks.

The system 700 may comprise the first user device 740, which may be a mobile phone. The first user device 740 may have subscriber identity module (SIM) data. The SIM data may comprise secure data used to access a mobile carrier network, such as to authenticate with the network. The SIM data may comprise, for example, a phone number associated with the SIM and/or the first user device 740 (e.g., a Mobile Directory Number (MDN)), an International Mobile Subscriber Identity (IMSI) number which may uniquely identify the SIM and/or user of the SIM on mobile communication networks, an authentication key (e.g., $K_i$) used to authenticate the SIM on the mobile communication network, and/or other data that may be used to identify and/or authenticate a subscriber of the network.

The SIM data may be stored in a physical SIM card inserted into the device 740, an embedded SIM (eSIM) embedded in the device 740, and/or a software SIM stored in memory of the device 740. The first user device 740 may be connected to the virtual mobile server 710 in order to send data, such as SIM data, to the virtual mobile server 710. As will be described in further detail below, SIM data may be used by the virtual mobile server 710 and/or the carrier cluster server 720 to simulate the first user device 740 and/or capabilities of the first user device 740 on another device, such as the second user device 750 or the third user device 760. By simulating the first user device 740, other devices may be used to send or receive phone calls, text messages, video calls, or other types of communication. Users may have, from other devices, the same or similar user experience as from the first user device 740. In some scenarios, users may be able to use the capabilities of the first user device 740, even if the first user device 740 is lost, damaged, or otherwise unavailable.

Figure 8A:
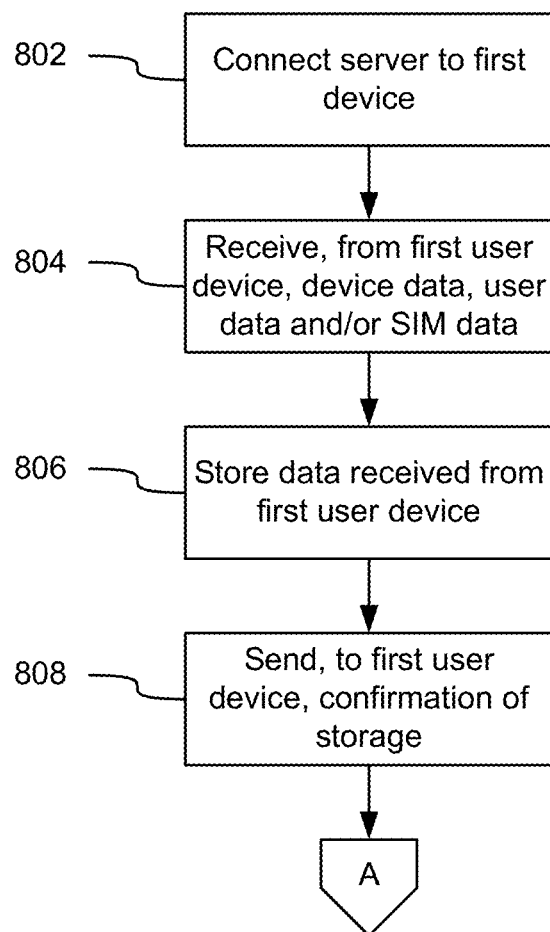
FIGS. 8a-c illustrate example methods for using identity data associated with a device for directing communications to another device in accordance with one or more illustrative aspects described herein.
Figure 8B:
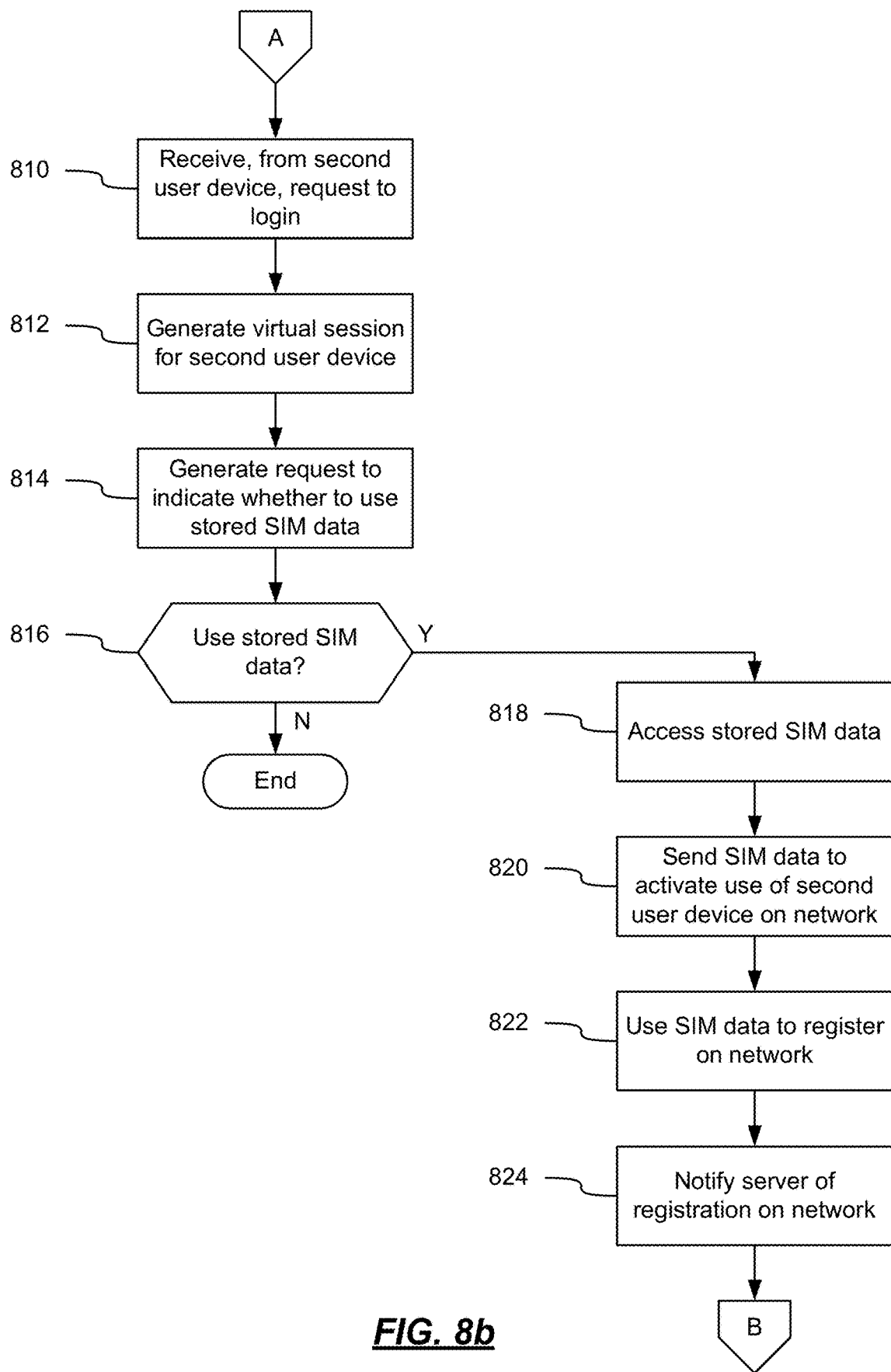
Figure 8C:
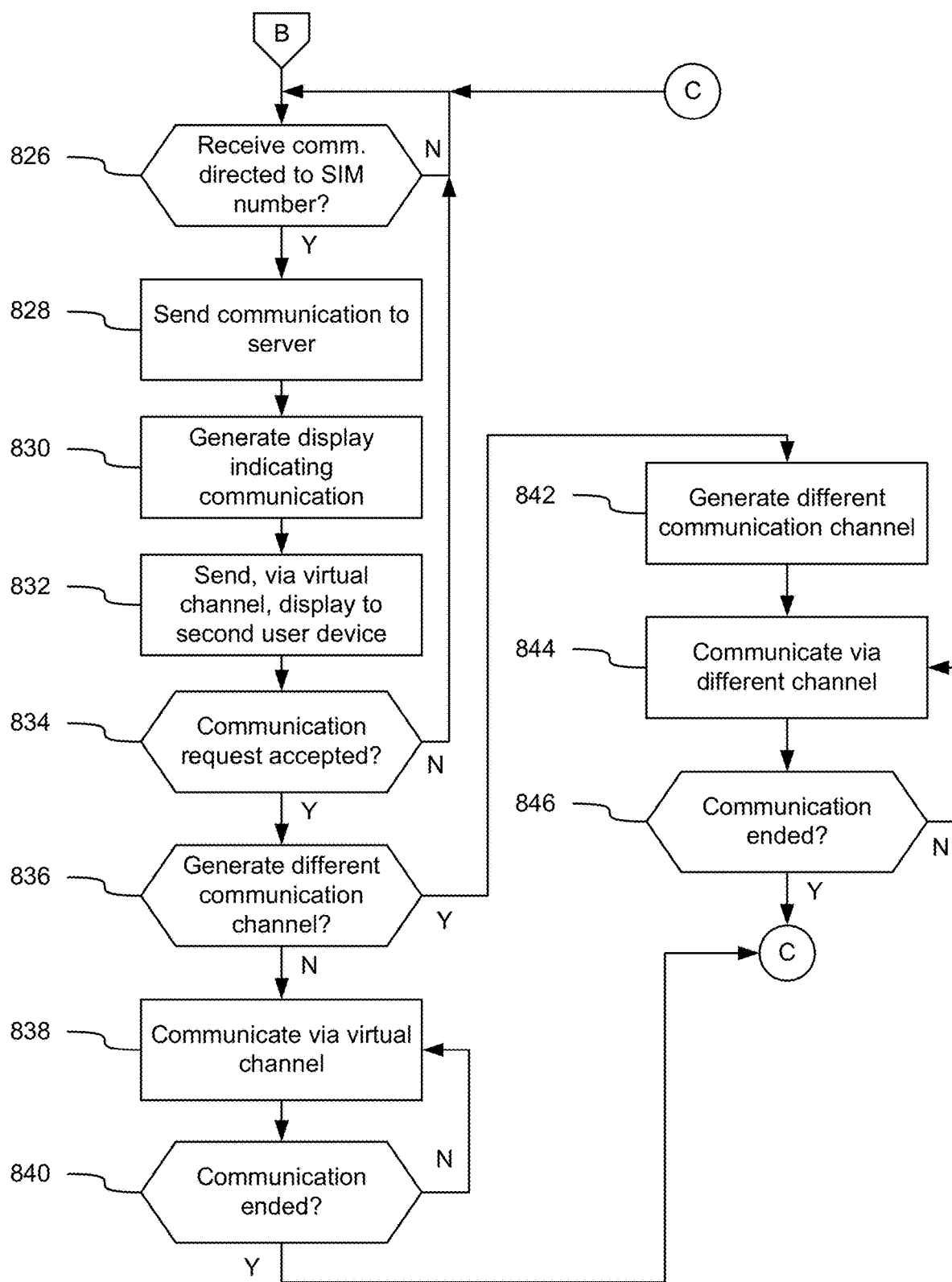

FIGS. 8*a*-*c* illustrate example methods for using identity data associated with a device for directing communications to another device in accordance with one or more illustrative aspects described herein. In step 802, the virtual mobile server 710 may be connected to the first user device 740. As previously explained, the first user device 740 may comprise a mobile phone and/or may have access to SIM data. For example, the SIM data may be stored in a physical SIM card inserted into the device 740, an eSIM embedded in the device 740, and/or a software SIM stored in memory of the device 740. The first user device 740 may be connected to the virtual mobile server 710 in order to send data, such as SIM data, to the virtual mobile server 710.

In step 804, the first user device 740 may send data to the virtual mobile server 710, and the virtual mobile server 710 may receive the data from the first user device 740. The data may be associated with the first user device 740, a user of the first user device 740, and/or SIM data of the first user device 740. SIM data may comprise, for example, a phone number associated with the SIM and/or the first user device 740, an International Mobile Subscriber Identity (IMSI) number that uniquely identifies the SIM and/or user of the SIM on mobile communication networks, an authentication key (e.g., $K_i$) used to authenticate the SIM on the mobile communication network, and/or other data that may be used to identify and/or authenticate a subscriber of the network.

The data received by the virtual mobile server 710 may also comprise data associated with the first user device 740 and/or with a user of the first user device 740. For example, the data may indicate the applications, such as mobile applications, installed on the first user device 740. The data may indicate a subset of the applications installed on the first user device 740, such as communication applications (e.g., texting applications, voice call applications, video-telephony applications, Voice over IP (VoIP) applications, and the like) or other types of applications. The data may also indicate a layout of the applications or icons for the applications, on a display of the first user device 740. With brief reference to FIG. 7, an exemplary layout 742 of the applications or icons for the applications on the first user device 740 is shown. The data received by the virtual mobile server 710 may also comprise user application data associated with the applications installed on the first user device, such as chat history associated with a chat application, voice call history associated with a voice call application, etc. The data may also comprise other types of data, such as address book information (e.g., phone numbers, email addresses, etc. of contacts), data indicating an operating system of the first user device 740 (e.g., iOS, ANDROID, etc.), and other device or user data.

Returning to FIG. 8a, in step 806, after receiving the data from the first user device 740, the virtual mobile server 710 may store the data received from the first user device 740. The virtual mobile server 710 may synchronize one or more of the received data with a profile of the user of the first user device 740. For example, a web service may be used for synchronization. The stored data may be associated with the user or the user's device 740, such as by a unique identifier, the user's profile, etc.

In some examples, SIM data may be preemptively stored at the virtual mobile server 710. For example, the SIM data might not be directly available to the first user device 740 and/or the user of the device 740. Instead, the virtual mobile server 710 may receive SIM data from a different source, such as from the carrier cluster server(s) 720 and/or directly from the mobile communication network 730. The virtual mobile server 710 may store the received SIM data. In these examples, the virtual mobile server 710 might still receive device and/or user data from the first user device 740, such as applications installed on the device 740, layout of the installed applications, user application data, operating system information, etc.

In step 808, the virtual mobile server 710 may send, to the first user device 740, a confirmation that the data has been stored at the virtual mobile server 710. The confirmation may indicate that the SIM data and/or the user data was successfully stored. The confirmation may also indicate that the SIM data and/or user data may be used by another device to, for example, receive phone calls, text messages, or other communications directed to the first user device 740. The virtual mobile server 710 may wait to receive a request to use the SIM and/or user data, such as from another device (e.g., the second user device 750, the third user device 760, or another user device). For example, the user may desire to use capabilities of the SIM data of the first user device 740, such as making or taking phone calls or sending or receiving text messages, on another device.

With reference to FIG. 8b, in step 810, a second user device 750 may send, to the virtual mobile server 710, a request to login to a virtual session, such as a virtual application or virtual desktop, and the virtual mobile server 710 may receive the request from the second user device 750. The second user device 750 may comprise, for example, a tablet computer. The request may include user credentials, such as a username and password, biometrics, etc. The virtual mobile server 710 may authenticate the user based on the credentials and log the user in after authentication.

In step 812, the virtual mobile server 710 may generate a virtual session (e.g., a virtual application or a virtual desktop) for the second user device 750 after the user is logged in. For example, the virtual mobile server 710 may generate a virtual machine for the second user device 750. In some examples, the type of virtual machine generated for the second user device 750 may be based on the operating system of the first user device 740 (e.g., iOS, ANDROID, etc.). For example, the virtual machine may emulate the operating system of the first user device 740 on the second user device 750. As shown in FIG. 7, the layout 752 of applications or application icons on the second user device 750 may be the same or similar to the layout 742 of applications or application icons on the first user device 740. As previously explained, data indicating the operating system of the first user device 740 and/or the layout of applications or application icons on the first user device 740 may have previously been stored at the virtual mobile server 710. The virtual mobile server 710 may use the stored data to generate a virtual machine with the appropriate layout 752.

The second user device 750 may be connected to the virtual machine running on the virtual mobile server 710 via a virtual channel 772. The virtual mobile server 710 may send, via the virtual channel 772 and to the second user device 750, image data. The virtual mobile server 710 may also receive, via the virtual channel 772 and from the second user device 750, key inputs, touch inputs, etc. As will be described in further detail below, the virtual session may be used to send, to the second user device 750, communications intended for the phone number associated with the first user device 740. For example, the second user device 750 may use calling, texting, or other communication capabilities of the first user device 740.

In step 814, the virtual mobile server 710 may generate an image for requesting the user to indicate whether to use (e.g., activate) the SIM data stored at the virtual mobile server 710. The virtual mobile server 710 may send the generated image to the second user device 750. The second user device 750 may display a message to the user requesting the user to indicate whether to use the SIM data. The user may select an option to use (or not to use) the SIM data. The second user device 750 may send, to the virtual mobile server 710 and via the virtual channel 772, data indicating the user's selection. For example, the server 710 may receive, from the second user device 750, a request by the user to access one or more capabilities of the first user device (e.g., calling capabilities, texting capabilities, etc.).

In step 816, the virtual mobile server 710 may determine whether the user requested to use the SIM data of the first user device 740. If the user did not request use of the SIM data of the first user device 740 (step 816: N), the process may end, and the first user device 740 may continue to receive phone calls, text messages, etc. directed to the SIM of the first user device 740. On the other hand, if the user requested to use the SIM data via the second user device 750 (step 816: Y), the method may proceed to step 818.

In step 818, the virtual mobile server 710 may access the stored SIM data, which may have previously been stored at the virtual mobile server 710 or another location accessible to the virtual mobile server 710. The stored data may comprise stored SIM data (e.g., phone number, authentication key, IMSI, or other identity data) and/or user or device data (e.g., applications on the first user device 740, layout of applications or icons, application data, etc.).

In step 820, the virtual mobile server 710 may send, to the carrier cluster server 720, the SIM data for activating use of the second user device 750 on the mobile communication network 730. As previously explained, the carrier cluster server 720 may provide carrier communication services to facilitate phone calls, text messages, or other communications between devices. The SIM data may be used to register the user on the mobile communication network 730. In some examples, the SIM data may already be stored at the carrier cluster server 720, and the virtual mobile server 710 might not have to send the data to the server 720. Rather, the virtual mobile server 710 may send a request to the carrier cluster server 720 to use the SIM data stored at the server 720 to activate use of the second user device 750 on the mobile communication network 730. Or the virtual mobile server 710 and the carrier cluster server 720 may comprise the same server or cluster of servers, and the virtual mobile server 710 might not have to send the data to the server 720.

In step 822, the carrier cluster server 720 and/or the virtual mobile server 710 may use the SIM data (e.g., phone number, authentication key, IMSI, or other identity data) to register use of the second user device 750 on the mobile communication network 730. The carrier cluster server 720 and/or the virtual mobile server 710 may activate the SIM data and may use the SIM data (or portions thereof) to authenticate the user with the mobile communication network 730. For example, the carrier cluster server 720 and/or the virtual mobile server 710 may send, to a base station of the mobile communication network 730 and via a communication link 776, a request to register the SIM data with the mobile communication network 730. The registration request may include the SIM data or portions of the SIM data.

After the SIM data is registered with the mobile communication network 730, calls, text messages (e.g., SMSs, MMSs, etc.), or other communications directed to the phone number (e.g., an MDN) for the SIM may be sent to the second user device 750 instead of the first user device 740. For example, if there is a call to the phone number, a base station of the mobile communication network 730 may route the call to the carrier cluster server 720 and/or the virtual mobile server 710 having the SIM data because the carrier cluster server 720 and/or the virtual mobile server 710 registered the SIM data with the mobile communication network 730. Moreover, the mobile communication network 730 might not route the call to the first user device 740. If the first user device 740 reconnects to the mobile communication network 730 using the SIM data at a later time, calls, text messages, or other communications may be routed back to the first user device 740 instead of the carrier cluster server 720 or the virtual mobile server 710.

In step 824, the virtual mobile server 710 may be notified, by the cluster server 720 and/or the mobile communication network 730, that the SIM data has been registered for the mobile communication network 730. As will be described in further detail below, the virtual channel 772 and/or virtual session between the second user device 750 and the virtual mobile server 710 may be used to send, to the second user device 750, communications intended for the phone number associated with the first user device 740 or SIM data thereof. The virtual mobile server 710 may send, to the second user device 750, a notification indicating that communications intended for the phone number will be routed to the second user device 750. The virtual mobile server 710 may send a similar notification to the first user device 740.

With reference to FIG. 8c, in step 826, the mobile communication network 730 may determine whether it has received a communication directed to a phone number associated with the SIM data. If the communication is a phone call, the communication request may comprise, for example, a ringing signal. If a communication request has not been received (step 826: N), the mobile communication network 730 may wait to receive a communication directed to the phone number. If the mobile communication network 730 receives a communication indicating the phone number associated with the SIM as the destination (step 826: Y), the method may proceed to step 828. In some examples, the mobile communication network 730 may determine the appropriate base station to route the communication to, such as a base station within proximity of the carrier cluster server 720 or the virtual mobile server 710 having the SIM data that was registered with the mobile communication network 730.

In step 828, the carrier cluster server 720 may send, to the virtual mobile server 710, the communication request directed to the phone number. The virtual mobile server 710 may receive the communication request from the carrier cluster server 720. For example, if the communication request is a phone call, the carrier cluster server 720 may send, to the virtual mobile server 710, a ringing signal.

In step 830, the virtual mobile server 710 may generate a display comprising an indication of the incoming communication request. In step 832, the virtual mobile server 710 may send, via the virtual channel 772 and to the second user device 750, an image indicating the communication request. The second user device 750 may display an alert to the user of the second user device 750. The display may alert the user of the second user device 750 of the communication, such as an incoming text message or phone call.

Figure 9:
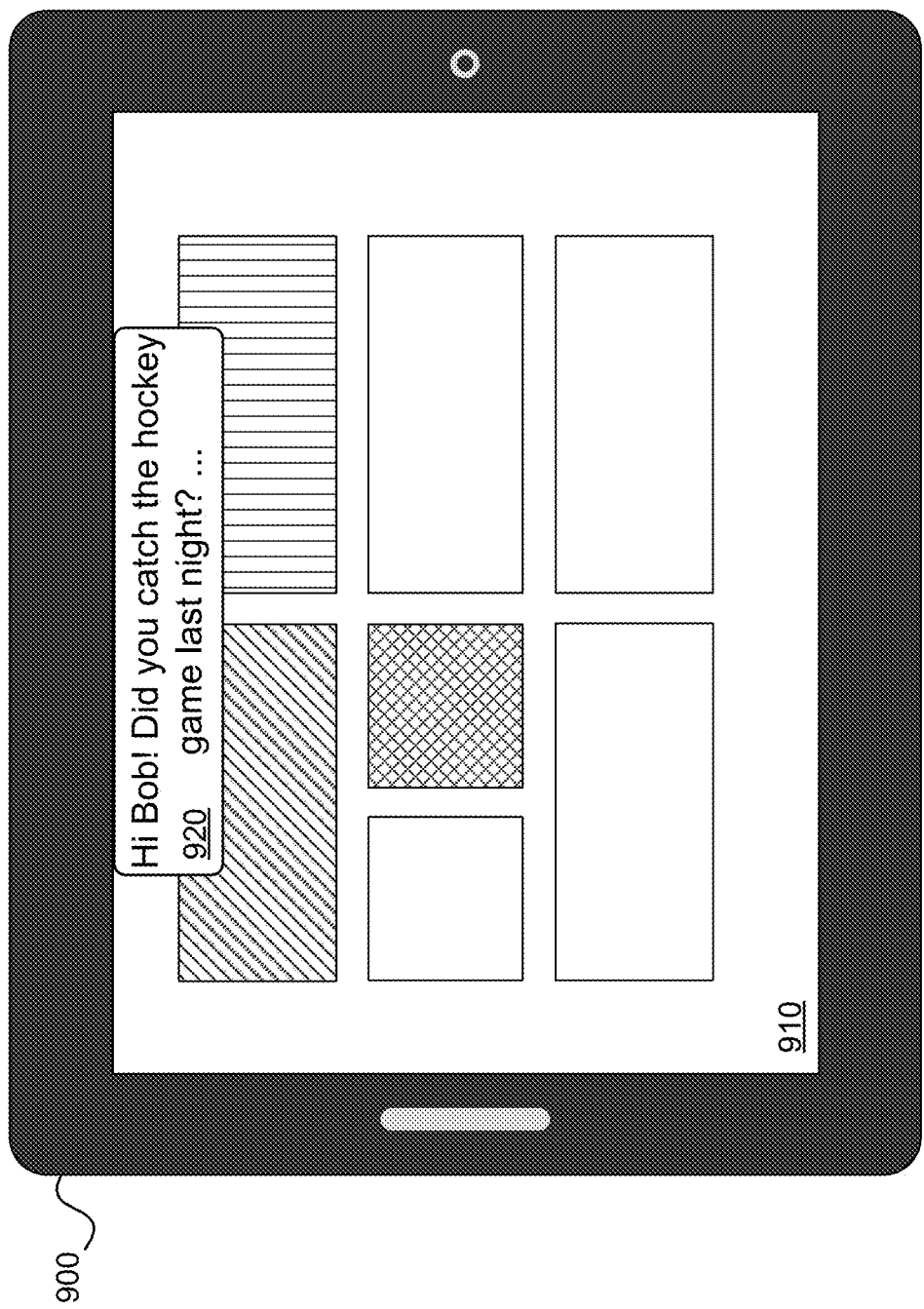
FIG. 9 illustrates an example of a user device and a display thereof in accordance with one or more illustrative aspects described herein.

FIG. 9 illustrates an example of a user device 900 and a display 910 thereof in accordance with one or more illustrative aspects described herein. The display 910 may be generated if the communication comprises, for example, a text message directed to the phone number associated with the SIM. The display 910 may include the text message 920 (or a portion of the text message). The display 910 may also include an indication of the sender, such as a phone number or name of the sender (not shown).

Figure 10:
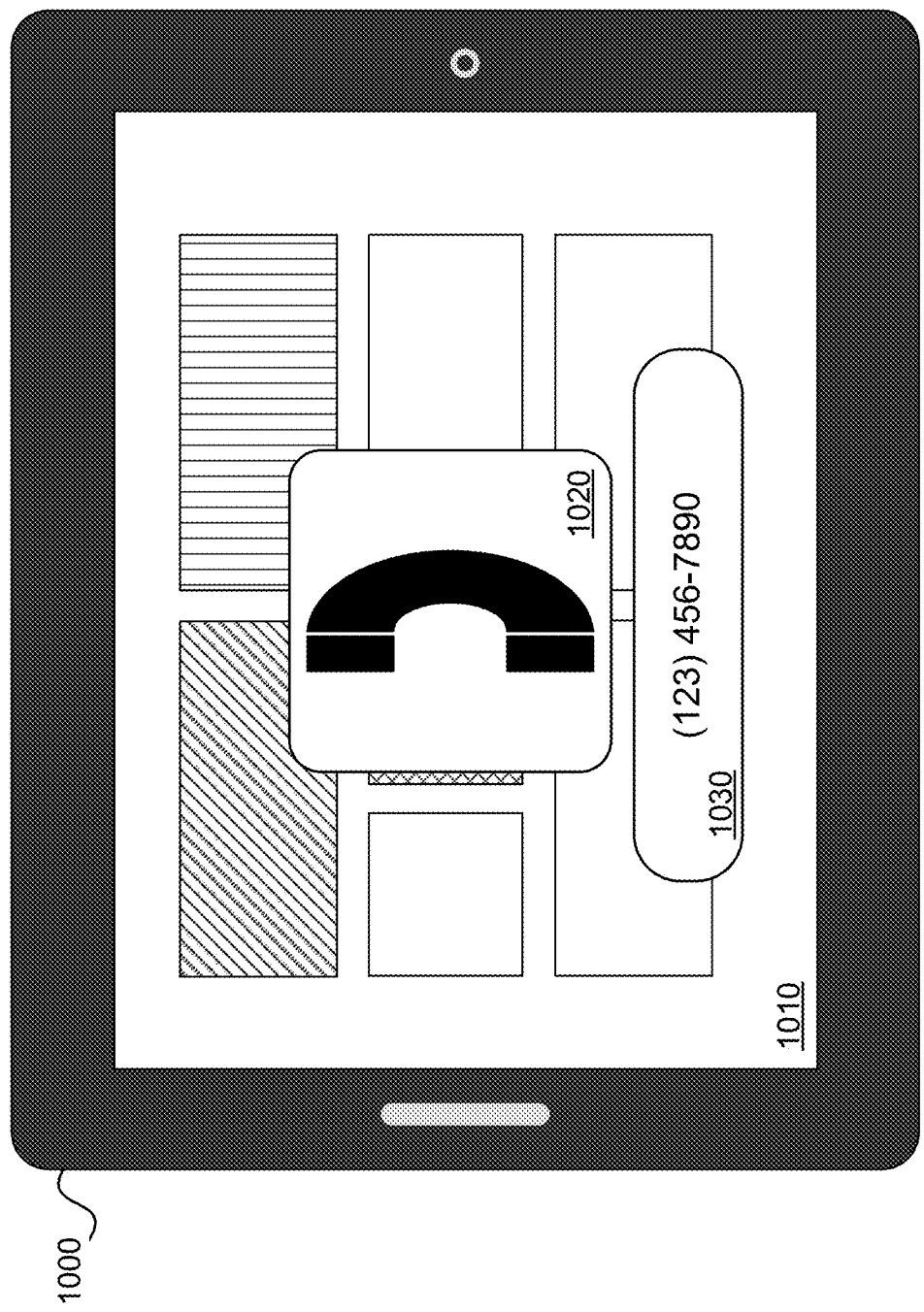
FIG. 10 illustrates another example of a user device and a display thereof in accordance with one or more illustrative aspects described herein.

FIG. 10 illustrates another example of a user device 1000 and a display 1010 thereof in accordance with one or more illustrative aspects described herein. The display 1010 may be generated if the communication comprises, for example, a phone call directed to the phone number associated with the SIM. The display 1010 may include an icon 1020 indicating the incoming phone call. The display 1010 may also include an indication 1030 of the caller, such as a phone number or name of the caller. The user of the second user device 750 may select an option to accept the phone call. The second user device 750 may send, to the virtual mobile server 710 and via the virtual channel, an indication that the user accepted the phone call, and the virtual mobile server 710 may receive the indication from the second user device 750.

Returning to FIG. 8c, in step 834, the virtual mobile server 710 may determine whether the communication request was accepted by the user using the second user device 750. If the communication request was not accepted by the user (step 824: N), the method may return to step 826 to determine whether another communication request directed to the phone number associated with the SIM data has been received. For example, the user might not accept the phone call and/or might select an option to reject the phone call. If, instead, the user accepted the communication request (step 834: Y), the method may proceed to step 836.

In step 836, the virtual mobile server 710 and/or the second user device 750 may determine whether to generate a communication channel different from the virtual channel for sending and receiving communication data (e.g., voice data). Voice or other associated data may be sent through the virtual channel 772 or through a different communication channel. Whether communications are sent through the virtual channel 772 or a different channel may be based on bandwidth requirements for the communications. For example, if bandwidth requirements for the communications are above a threshold bandwidth (e.g., for a high bandwidth video call), communications may be sent through a dedicated channel. If bandwidth requirements for the communications are below a threshold bandwidth (e.g., for a lower bandwidth voice only call), communications may be sent through the virtual channel 772. If communications are to be sent through a different channel (step 836: Y), the method may proceed to step 842, as will be described in further detail below. If communications are to be sent through the virtual channel (step 836: N), the method may proceed to step 838.

In step 838, the second user device 750 may communicate with the other party via the virtual channel 772. A communication channel between the second user device 750 and a base station of the mobile communication network 730 may be established via the virtual channel 772. The second user device 750 may send voice data to the virtual mobile server 710 via the virtual channel 772. The virtual mobile server 710 may forward the voice data to a base station of the mobile communication network 730 for delivery to the other party. The virtual mobile server 710 may also receive voice data from the other party (e.g., via the base station), and may forward the voice data to the second user device 750 via the virtual channel 772. Similarly, the virtual mobile server 710 may be used to transmit image data to the second user device 750 for video calls.

In step 840, the virtual mobile server 710 and/or the second user device 750 may determine whether the communication with the other party has ended. For example, the phone conversation between the two parties may have ended. If the communication has not ended (step 840: N), the virtual mobile server 710 may continue to facilitate communications between the second user device 750 and the other party until the conversation has ended. If, on the other hand, the communication has ended (step 840: Y), the method may return to step 826 to wait for another communication request directed to the phone number associated with the SIM.

Returning to step 836, if communications are to be sent through a communication channel different from the virtual channel (step 836: Y), the method may proceed to step 842. In step 842, a communication channel 774 different from the virtual channel 772 may be established for communications, e.g., a phone and/or video call. The communication channel 774 may have a higher bandwidth than the virtual channel 772, and/or the communication channel 774 may be used to separate the voice or video communication data from other data being transmitted using the virtual channel 772. The communication channel 774 may be established between the second user device 750 and the carrier cluster server 720. For example, the second user device 750 may communicate directly with the carrier cluster server 720 via the communication channel 774, such as using a WAN or other network.

In some examples, a client agent of the second user device 750 (e.g., client agent 604 shown in FIG. 6) or other software installed on the second user device 750 may establish the communication channel 774. The communication channel 774 may be between the second user device 750 and the carrier cluster server 720. Alternatively, the communication channel 774 may be established between the second user device 750 and the virtual mobile server 710. For example, the virtual mobile server 710 and the carrier cluster server 720 may comprise the same server or be within the same cluster of servers.

In step 844, the second user device 750 may communicate with the other party via the communication channel 774. The second user device 750 may send voice data to the virtual mobile server 710 or the carrier cluster server 720 via the communication channel 774. The virtual mobile server 710 or the carrier cluster server 720 may forward the voice data to a base station of the mobile communication network 730 for delivery to the other party. The virtual mobile server 710 or the carrier cluster server 720 may also receive voice data from the other party (e.g., via the base station), and may forward the voice data to the second user device 750 via the communication channel 774. Similarly, the virtual mobile server 710 or the carrier cluster server 720 may be used to transmit image data to the second user device 750 for video calls.

In step 846, the virtual mobile server 710, the carrier cluster server 720, and/or the second user device 750 may determine whether the communication with the other party has ended. For example, a phone or video conversation between the two parties may have ended. If the communication has not ended (step 846: N), the virtual mobile server 710 or the carrier cluster server 720 may continue to facilitate communications between the second user device 750 and the other party until the conversation has ended. If, on the other hand, the communication has ended (step 846: Y), the method may return to step 826 to wait for another communication request directed to the phone number associated with the SIM.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   storing, by a server, subscriber identity module (SIM) data comprising a phone number associated with a first user device;
   connecting, via a virtual channel, a second user device to a virtual machine running on the server;
   receiving, from the second user device, a request to access one or more capabilities of the first user device;
   sending, to a mobile communication network associated with the first user device, the SIM data to register the second user device with the mobile communication network;
   receiving a request for a communication directed to the phone number;
   establishing a communication channel different from the virtual channel; and
   causing the second user device to initiate the communication via the communication channel.

2. The method of claim 1, wherein the establishing the communication channel is based on a determination that a bandwidth requirement for the communication is above a threshold bandwidth.

3. The method of claim 1, further comprising:
   receiving a request for a second communication directed to the phone number; and
   based on a determination that a bandwidth requirement for the second communication is below a threshold bandwidth, causing the second user device to initiate the second communication via the virtual channel.

4. The method of claim 1, wherein the one or more capabilities of the first user device comprises at least one of calling capabilities or texting capabilities of the first user device.

5. The method of claim 1, wherein the request for the communication comprises a ringing signal.

6. The method of claim 1, further comprising:
receiving, from the second user device, by the server, and via the virtual channel, an acceptance of the request for the communication directed to the phone number.

7. The method of claim 1, wherein the establishing the communication channel comprises establishing, via the virtual channel, the communication channel between the second user device and the mobile communication network.

8. The method of claim 1, wherein the sending the SIM data comprises sending, to a second server, a request to register the SIM data, and wherein the receiving the request for the communication comprises receiving, by the server and from the second server, a phone call directed to the phone number.

9. An apparatus comprising:
one or more processors; and
memory storing instructions that, when executed by the one or more processors, cause the apparatus to:
store subscriber identity module (SIM) data comprising a phone number associated with a first user device;
connect, via a virtual channel, a second user device to a virtual machine running on the apparatus;
receive, from the second user device, a request to access one or more capabilities of the first user device;
send, to a mobile communication network associated with the first user device,
the SIM data to register the second user device with the mobile communication network;
receive a request for a communication directed to the phone number;
establish a communication channel different from the virtual channel; and
cause the second user device to initiate the communication via the communication channel.

10. The apparatus of claim 9, wherein the instructions, when executed by the one or more processors, cause the apparatus to establish the communication channel by establishing the communication channel based on a determination that a bandwidth requirement for the communication is above a threshold bandwidth.

11. The apparatus of claim 9, wherein the instructions, when executed by the one or more processors, further cause the apparatus to:
receive a request for a second communication directed to the phone number; and
based on a determination that a bandwidth requirement for the second communication is below a threshold bandwidth, cause the second user device to initiate the second communication via the virtual channel.

12. The apparatus of claim 9, wherein the one or more capabilities of the first user device comprises at least one of calling capabilities or texting capabilities of the first user device.

13. The apparatus of claim 9, wherein the request for the communication comprises a ringing signal.

14. The apparatus of claim 9, wherein the instructions, when executed by the one or more processors, further cause the apparatus to receive, from the second user device and via the virtual channel, an acceptance of the request for the communication directed to the phone number.

15. The apparatus of claim 9, wherein the instructions, when executed by the one or more processors, cause the apparatus to establish the communication channel by establishing, via the virtual channel, the communication channel between the second user device and the mobile communication network.

16. The apparatus of claim 9, wherein the instructions, when executed by the one or more processors, cause the apparatus to send the SIM data by sending, to a server, a request to register the SIM data, and
wherein the instructions, when executed by the one or more processors, cause the apparatus to receive the request for the communication by receiving, from the server, a phone call directed to the phone number.

17. A non-transitory computer-readable medium storing instructions that, when executed by a computing device, cause the computing device to:
store subscriber identity module (SIM) data comprising a phone number associated with a first user device;
connect, via a virtual channel, a second user device to a virtual machine running on the computing device;
receive, from the second user device, a request to access one or more capabilities of the first user device;
send, to a mobile communication network associated with the first user device, the SIM data to register the second user device with the mobile communication network;
receive a request for a communication directed to the phone number;
establish a communication channel different from the virtual channel; and
cause the second user device to initiate the communication via the communication channel.

18. The non-transitory computer-readable medium of claim 17, wherein the instructions, when executed by the computing device, cause the computing device to establish the communication channel by establishing the communication channel based on a determination that a bandwidth requirement for the communication is above a threshold bandwidth.

19. The non-transitory computer-readable medium of claim 17, wherein the instructions, when executed by the computing device, further cause the computing device to:
receive a request for a second communication directed to the phone number; and
based on a determination that a bandwidth requirement for the second communication is below a threshold bandwidth, cause the second user device to initiate the second communication via the virtual channel.

20. The non-transitory computer-readable medium of claim 17, wherein the instructions, when executed by the computing device, cause the computing device to establish the communication channel by establishing, via the virtual channel, the communication channel between the second user device and the mobile communication network.

* * * * *